(12) United States Patent
Kiefer

(10) Patent No.: US 8,757,187 B2
(45) Date of Patent: Jun. 24, 2014

(54) LOAD-ABSORBENT DEVICE FOR INTRODUCING LOAD FORCES SUCH AS CABLE FORCES OR TENSIONING FORCES OF SHEET-LIKE STRUCTURES

(75) Inventor: Michael Kiefer, Radolfzell (DE)

(73) Assignee: Carl Stahl GmbH, Süssen (DE)

( * ) Notice: Subject to any disclaimer, the term of this patent is extended or adjusted under 35 U.S.C. 154(b) by 344 days.

(21) Appl. No.: 12/998,612

(22) PCT Filed: Mar. 27, 2009

(86) PCT No.: PCT/EP2009/002251
§ 371 (c)(1),
(2), (4) Date: May 9, 2011

(87) PCT Pub. No.: WO2010/054702
PCT Pub. Date: May 20, 2010

(65) Prior Publication Data
US 2011/0222960 A1    Sep. 15, 2011

(30) Foreign Application Priority Data

Nov. 11, 2008 (DE) .................... 20 2008 014 951 U
Jan. 29, 2009 (DE) .................... 20 2009 001 107 U

(51) Int. Cl.
*E04H 15/58* (2006.01)
*E04H 15/32* (2006.01)

(52) U.S. Cl.
USPC .......... 135/117; 135/90; 135/123; 135/120.4; 403/122; 248/288.51; 52/83

(58) Field of Classification Search
USPC .......... 135/90, 121, 123, 151–154, 117, 119, 135/120.3, 120.4, 905, 907; 248/288.11, 248/288.13, 288.15, 288.51, 314, 316.2, 248/284.1, 291.1; 160/373, 374, 374.1, 160/380–381, 368.1, 401, 22; 403/294, 403/361, 353, 52, 76, 122; 52/83, 222
See application file for complete search history.

(56) References Cited

U.S. PATENT DOCUMENTS

| | | | | |
|---|---|---|---|---|
| 2,693,195 A | * | 11/1954 | Frieder et al. | 135/122 |
| 3,593,997 A | * | 7/1971 | Boehner | 473/421 |
| 3,957,301 A | * | 5/1976 | Huber | 296/95.1 |
| 5,286,129 A | * | 2/1994 | French et al. | 403/24 |
| 5,311,699 A | * | 5/1994 | Huffman | 47/22.1 |
| 5,622,197 A | * | 4/1997 | Valaire | 135/90 |
| 5,778,613 A | * | 7/1998 | Thomson | 52/222 |
| 6,247,484 B1 | * | 6/2001 | Thomas | 135/123 |

FOREIGN PATENT DOCUMENTS

| | | | |
|---|---|---|---|
| EP | 1 256 668 | 11/2002 | |
| EP | 1 561 877 | 8/2005 | |
| JP | 05222869 A | * 8/1993 | ............. E04H 15/64 |
| WO | WO 81/00125 | 1/1981 | |

* cited by examiner

*Primary Examiner* — Winnie Yip
(74) *Attorney, Agent, or Firm* — Roylance, Abrams, Berdo and Goodman LLP

(57) ABSTRACT

A load-absorbing device initiates load forces such as cable forces or tensioning forces of sheet-shaped structures into supporting structures (10). At least one bearing element (24, 80) is anchored on supporting structure (10). A tie rod (40) of a load-absorbing part (36, 40) is connected to the bearing element. A connection device (50) for tension members (16; 98) cooperates with the tie bar (40). The connection device (50) has at least one connection wing (66) projecting laterally from the longitudinal axis (A) and forming at least one connection point (69*a*) offset with respect to the longitudinal axis (A).

9 Claims, 13 Drawing Sheets

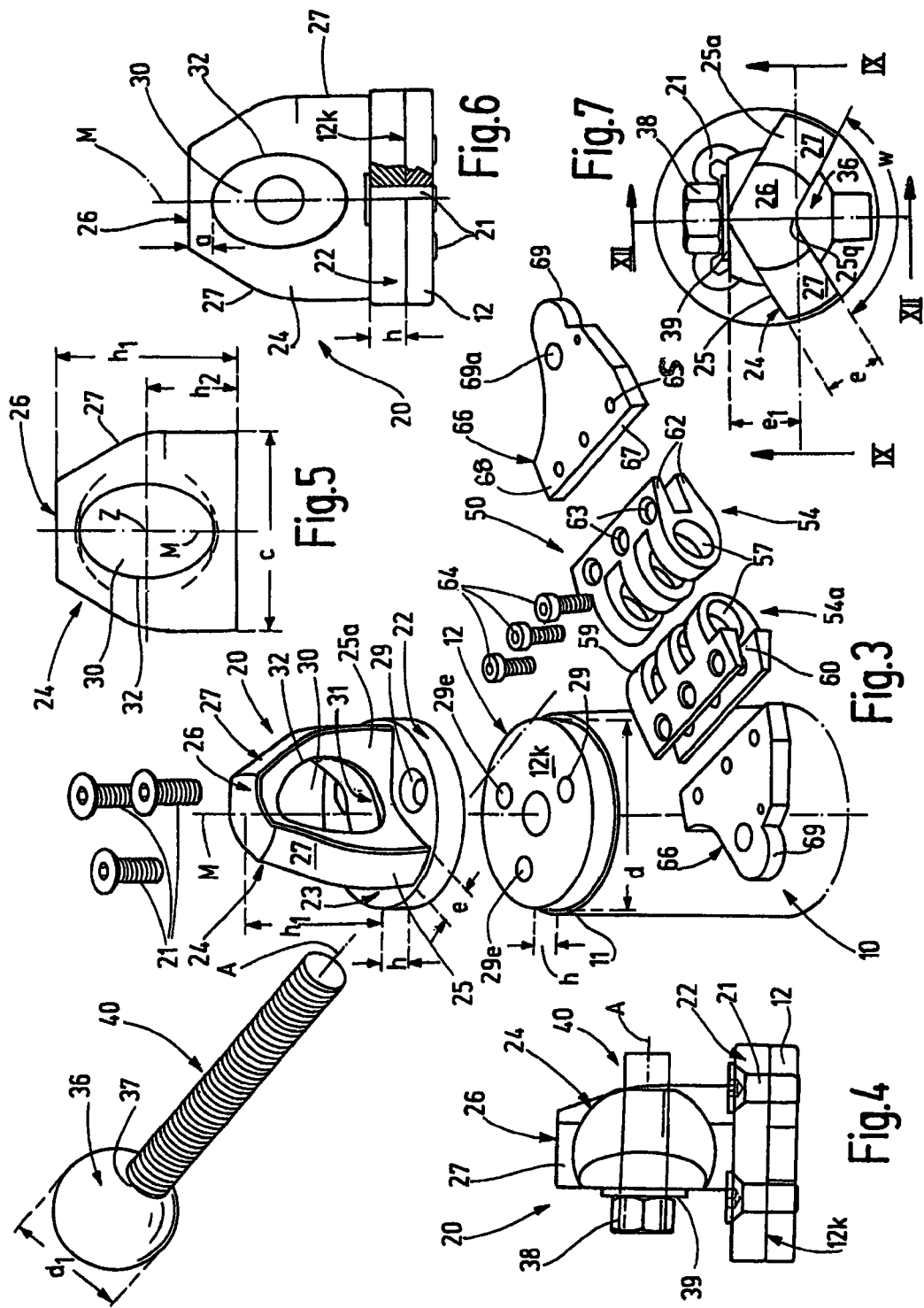

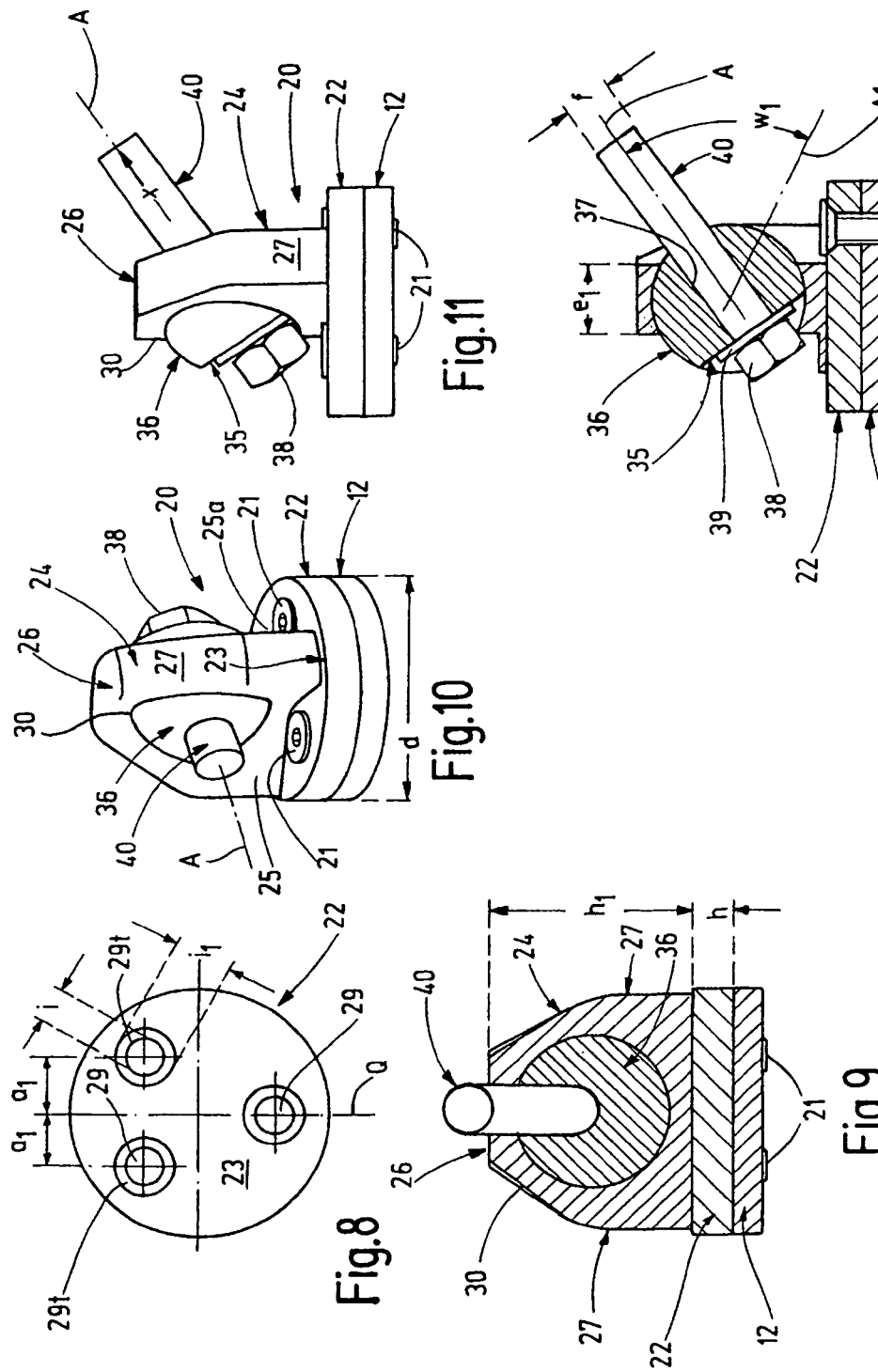

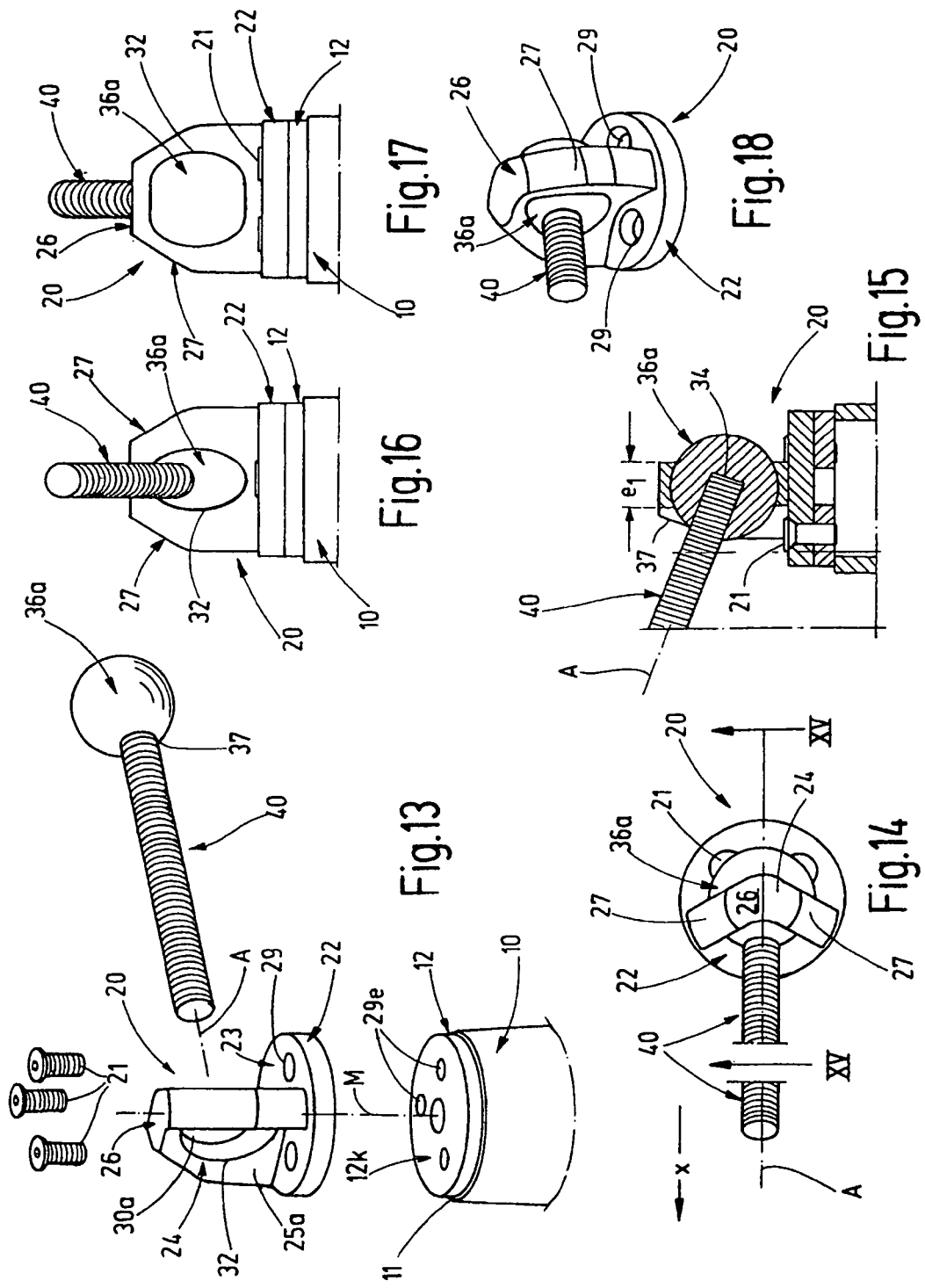

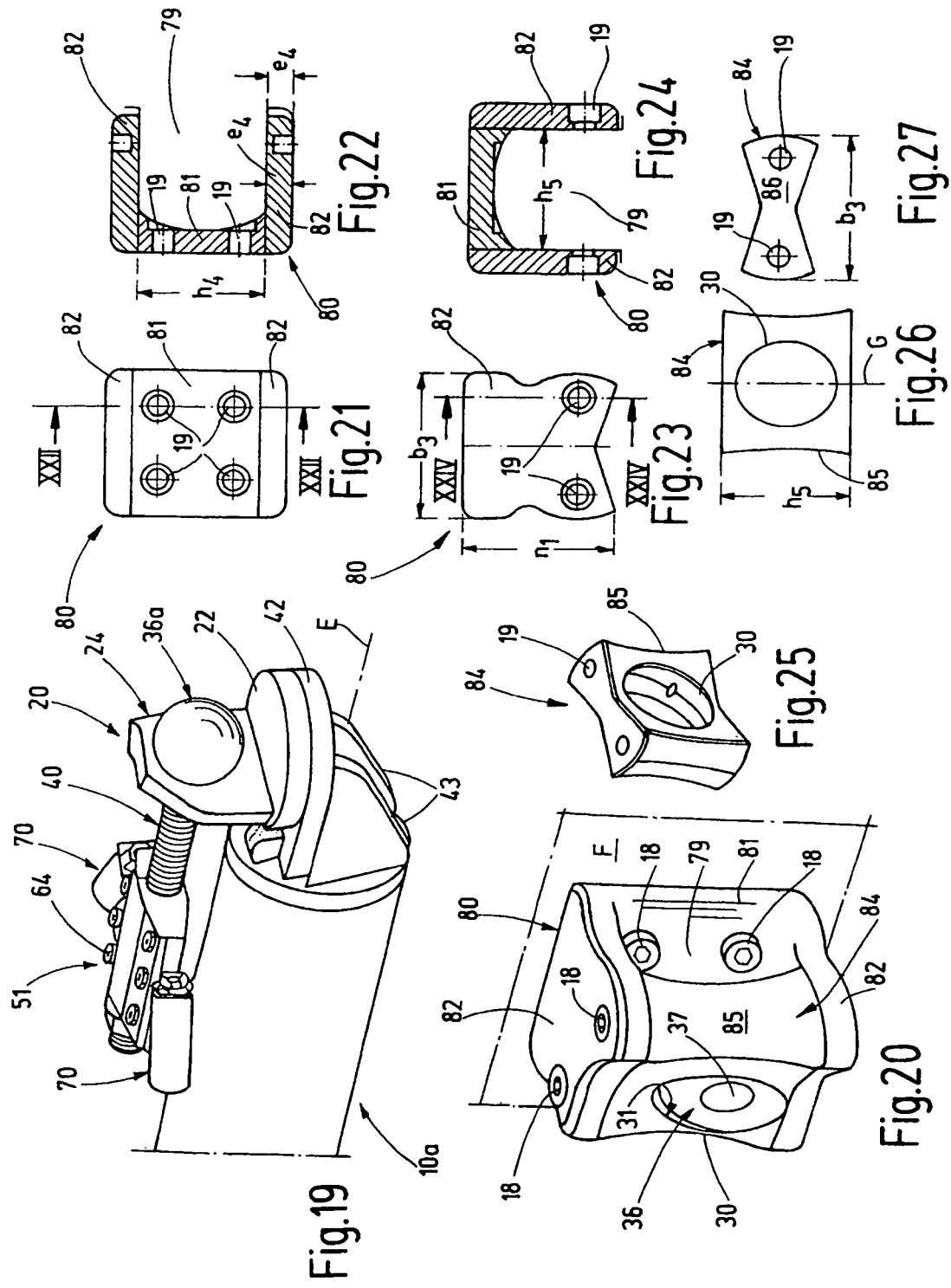

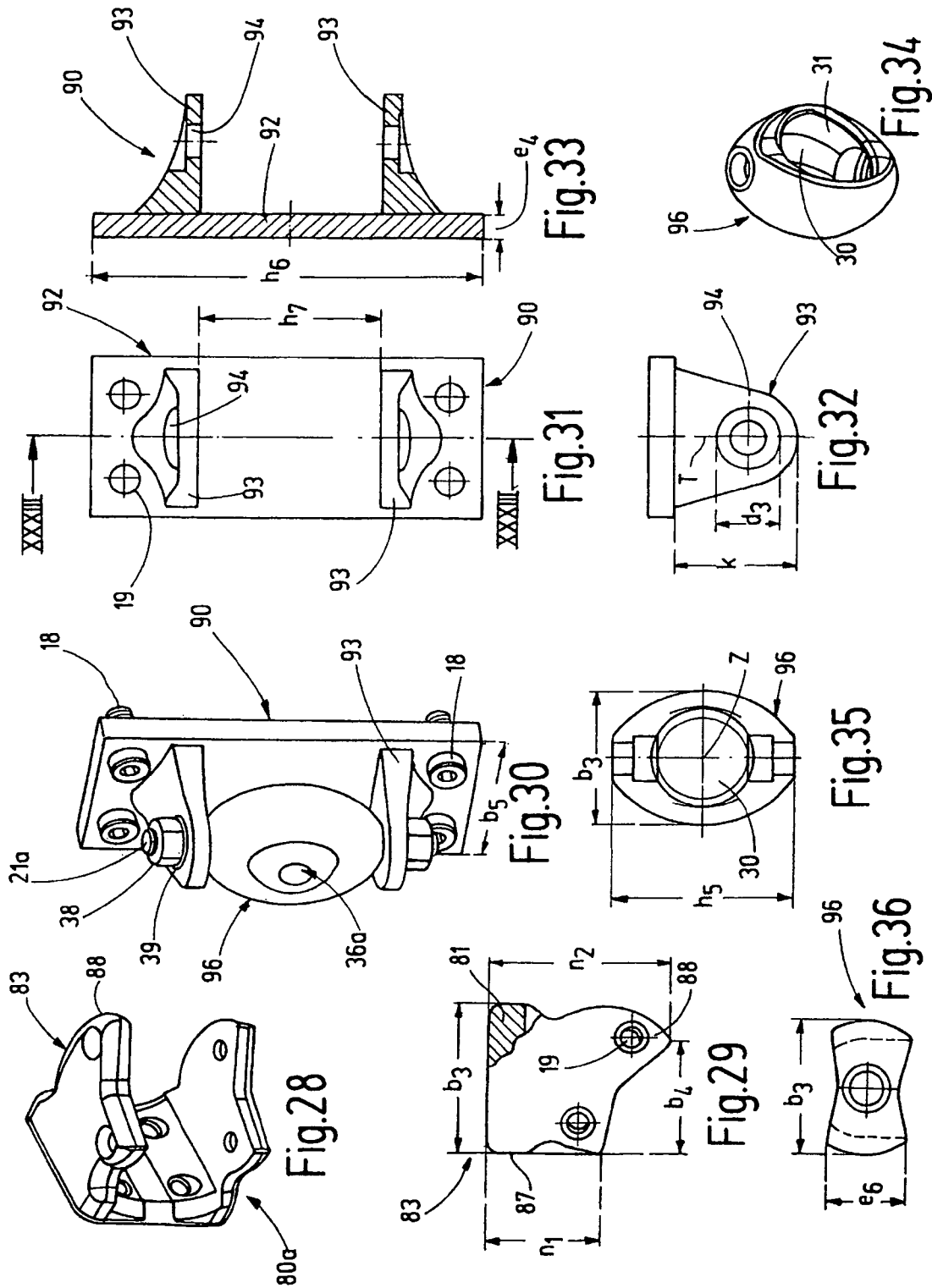

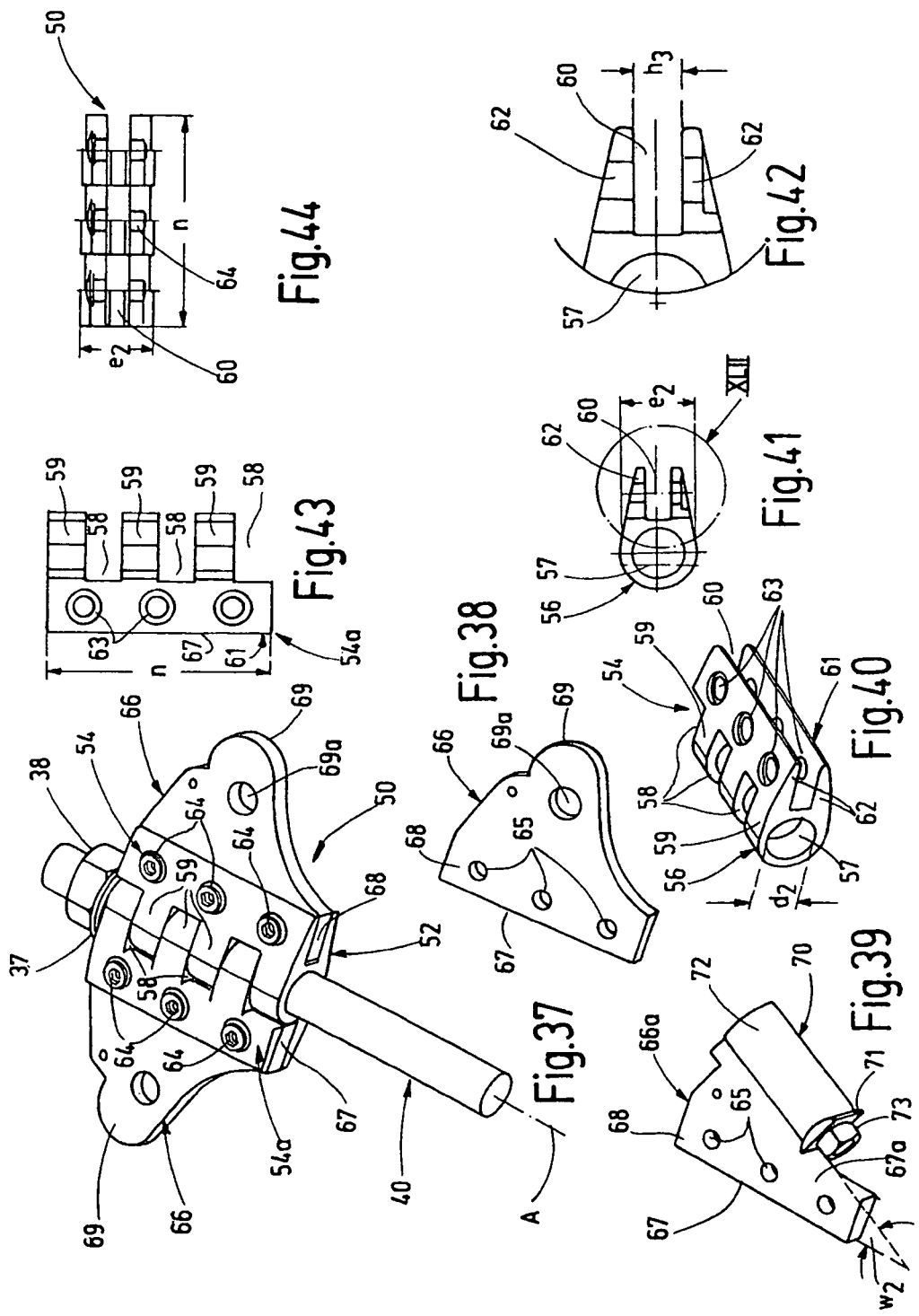

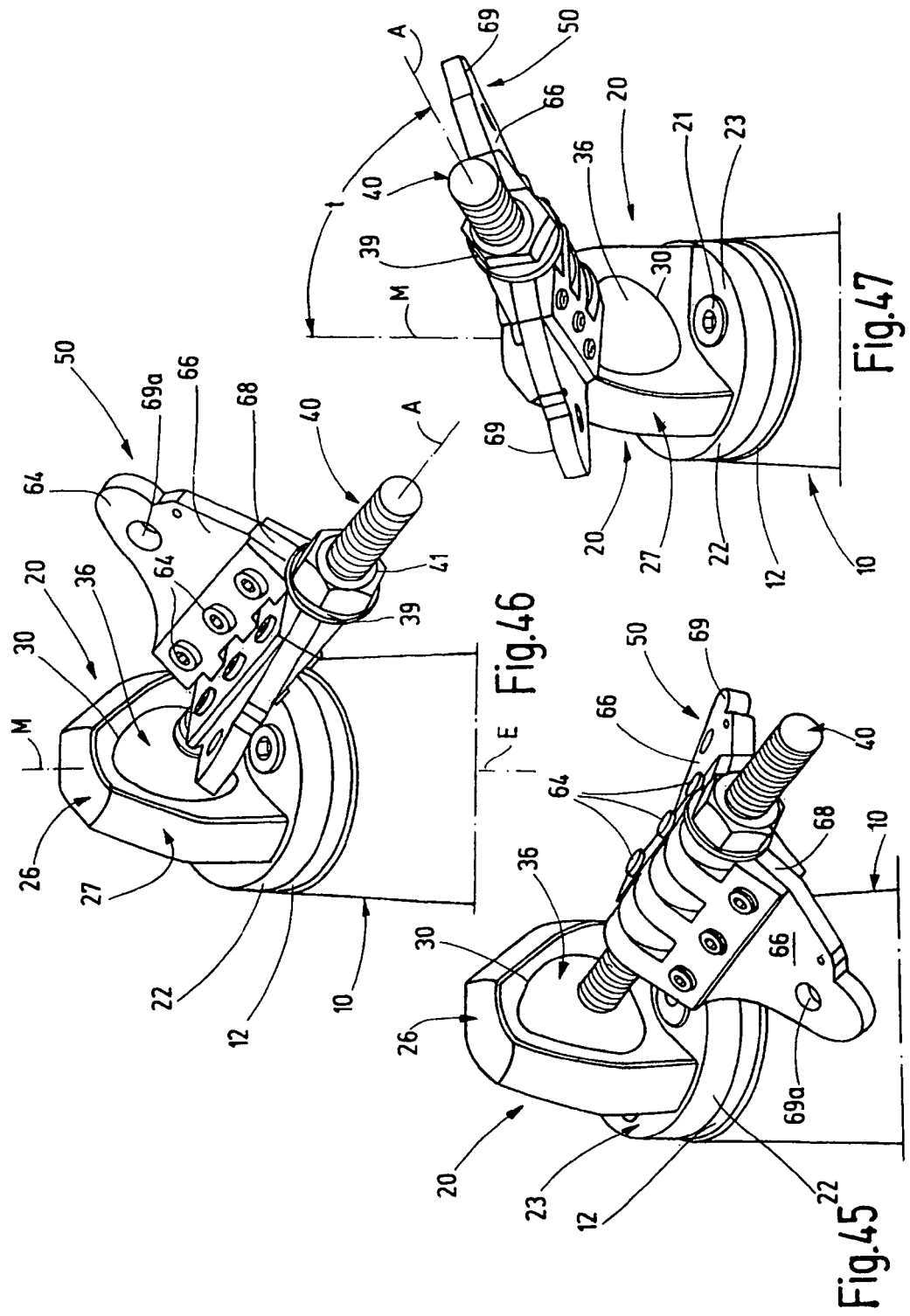

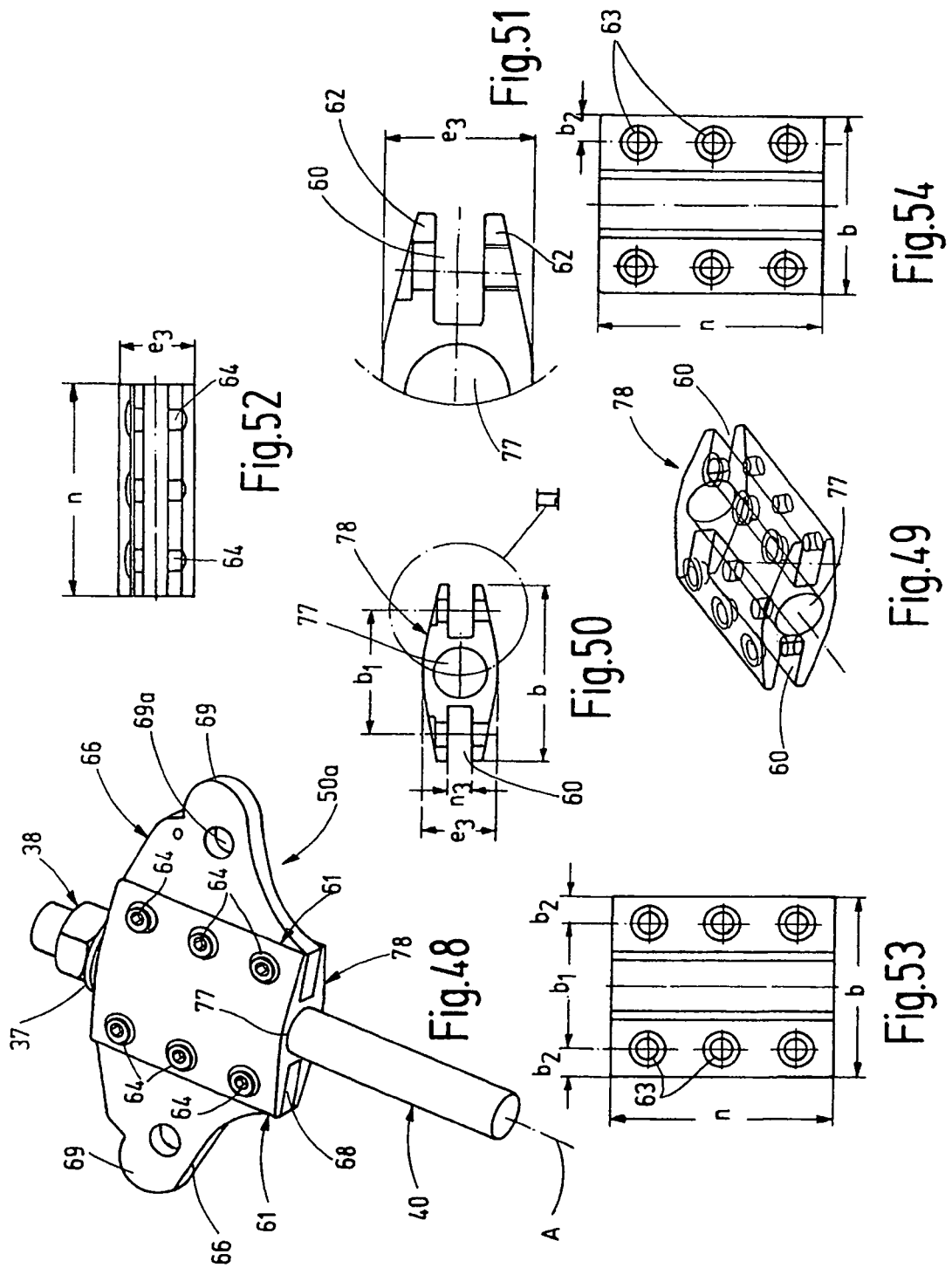

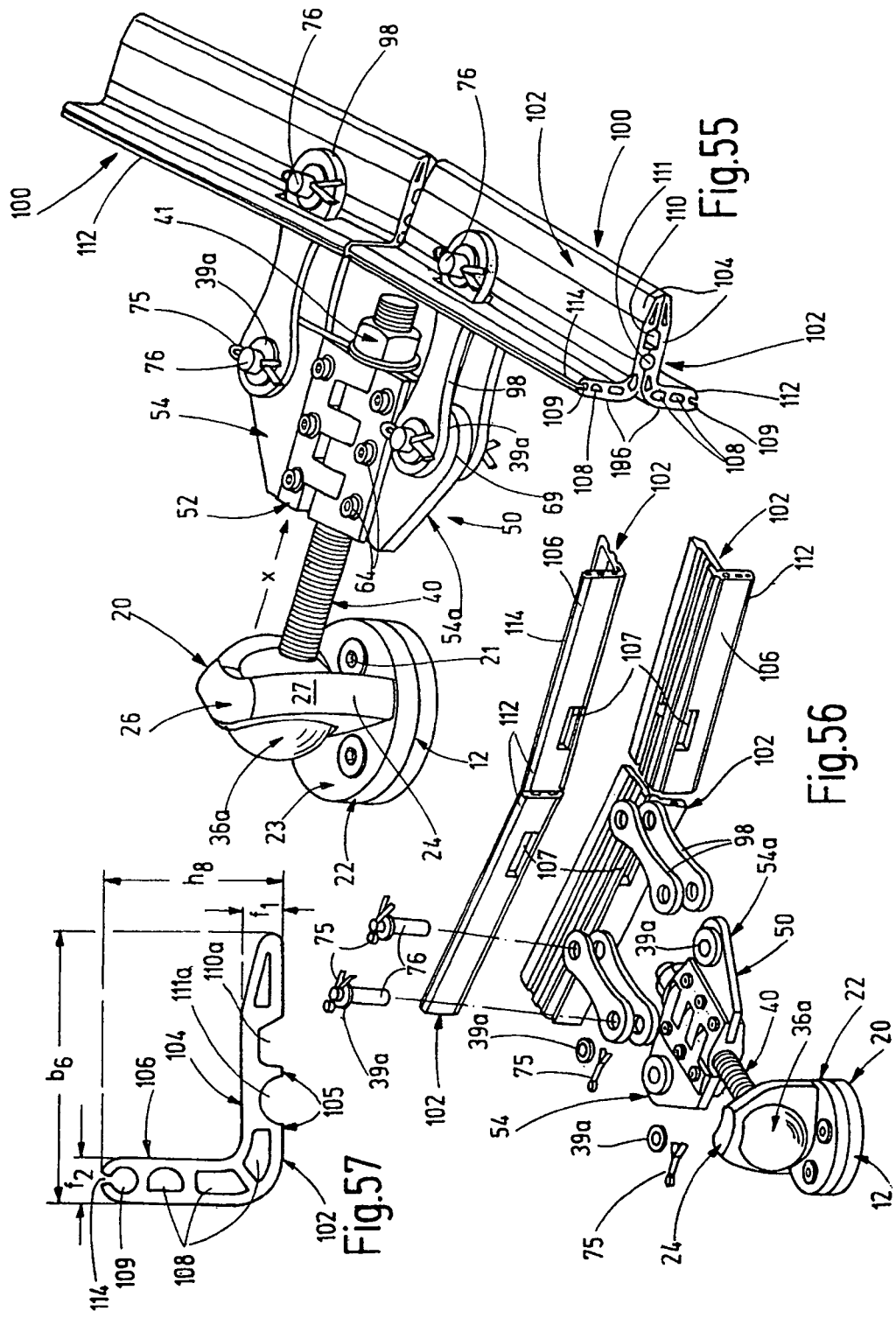

LOAD-ABSORBENT DEVICE FOR INTRODUCING LOAD FORCES SUCH AS CABLE FORCES OR TENSIONING FORCES OF SHEET-LIKE STRUCTURES

FIELD OF THE INVENTION

The invention relates to a load-absorbent device for introducing load forces, such as cable forces or tensioning forces of sheet-like structures, into supporting structures. The device comprises at least one bearing element anchored to the pertinent supporting structure, a tension rod of a load-absorbent part connected to the bearing element, and a connecting device for tensioning members interacting with the tension rod.

BACKGROUND OF THE INVENTION

Modern architecture has increasingly incorporated concepts of load-bearing structures, where planar elements, such as tent-like or umbrella-like coverings that form, as a textile building material, part of a load-bearing structure. Such structures are anchored or erected on support systems, for example, steel supports. To form the respective elements form space-creating structures of a desired architectural design, the respective suitable introduction of load forces, in particular, the tensioning or bearing cable forces, is a crucial factor. To avoid distortions of the desired architectural design, the surface elements are conventionally braced on a plurality of connecting points. A corresponding plurality of tensioning members, such as tensioning cables must be attached to a corresponding number of load-absorbing devices. This arrangement leads to considerable installation effort, especially since pertinent bearing elements may not be comfortably accessible on the support system of the supporting structure, such as, for example, supports, with varying inclination.

SUMMARY OF THE INVENTION

An object of the invention is to provide an improved load-absorbing device of with a simple design enabling reliable connection of tensioning members to the tension rod with low installation effort.

The invention basically achieves this object with a load-absorbing device where the connecting device has at least one connecting wing projecting laterally from the longitudinal axis and forming at least one connection point offset relative to the longitudinal axis. Compared to a coaxial connection of tensioning members, such as cables or brackets or the like, to a tension rod, the connection to a laterally projecting component is much simpler, both with respect to the installation effort and the use of the required connectors.

The arrangement can be especially advantageously made such that the respective wing is supported on the tension rod to be able to swivel around the longitudinal axis. Regardless of the respective circumstances, the connection point can then be moved into the position especially suitable for the installation process. At the same time, the connection point can be set into the optimum swivel position under the action of the tensioning force.

Advantageously, the connecting device has two wings extending in different directions away from the longitudinal axis. This type in an especially advantageous manner enables the connection of several tensioning members to a common load-absorbing member.

The arrangement can be made especially advantageously when the two wings are formed by plates of the same shape and are rigidly connected to a hinge member forming the swivel bearing of the pertinent wing on the tension rod. For connection points formed on laterally projecting plates, not only is the coupling of the tensioning cables made simple, reliable, and convenient, but this construction is also especially suited to mounting tent-like or sail-like surface supporting structures in which there is no securing at points, but which are mounted on edge regions with, as it were, "linear fastening." In these cases, the pertinent sheet-shaped supporting structure (tent, sail, or membrane) on the edge is provided with a keder. In the connecting sections, this keder is surrounded by a keder groove profile which holds it and which can be connected in turn to the pertinent load-absorbing member, that is, the assigned tension rod. This arrangement can take place especially advantageously such that the plates forming the connecting wings at the connection points form linkage sites for tension brackets which, on the other hand, are connected to linkage sites on the pertinent keder groove profile located at a mutual distance from one another.

The hinge member forming the swivel bearing of the wings on the tension rod can be constructed as one piece and can horizontally connect the wings rigidly to each other in a common plane.

Another possibility for equalization or setting movements can involve the hinge member being multi-part. For each wing the hinge has one bearing part with which the wings can be swiveled around the longitudinal axis independently of each other.

As another configuration, the respective wing can be supported on the hinge member to be able to swivel around another axis perpendicular to the swiveling axis of the hinge member corresponding to the longitudinal axis of the tension rod.

Preferably, the tension rod has an external thread on which an adjusting nut forms an axial safeguard of the connecting device. By actuating the adjusting nut, a turnbuckle-like tensioning or retensioning of the connecting device and in turn of the respective pertinent tensioning members is advantageously made possible.

Regardless of the configuration of the connection to one or to two connecting wings, rigid connection of connecting wings, or individual or joint swiveling capacity of the respective wings around the longitudinal axis of the tension rod, a spherical body attached to the tension rod for forming a hinge joint on the bearing element can be supported on a support surface forming one part of a spherical cap. A ball-and-socket joint is then formed on the bearing element.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 3 is a perspective view of the disassembled hinge holder of FIG. 2 with its insert screw or rotary screw as well as with an end disk of the column;

FIG. 4 is a side elevational view of the assembled hinge holder of FIG. 3 with an inserted insert screw;

FIG. 5 is a front elevational view of the hinge holder of FIG. 3;

FIG. 6 is a rear elevational view of the hinge holder of FIG. 3;

FIG. 7 is a top plan view of the hinge holder of FIG. 3;

FIG. 8 is a top plan view of a base plate of the hinge holder of FIGS. 3 and 6;

FIG. 9 is a vent elevational view in section taken along line IX-IX of FIG. 7;

FIG. 10 is a perspective view of the hinge holder of FIG. 2;

FIG. 11 is a side elevational view of the hinge holder of FIG. 10;

FIG. 12 is side elevational view in section of the hinge holder of FIG. 10, along the line XII-XII of FIG. 7;

FIG. 13 is a perspective view of a hinge holder according to a second exemplary embodiment of the invention, with its insert or rotary screw as well as with the end region of the column;

FIG. 14 is a top plan view of the assembled hinge holder of FIG. 13;

FIG. 15 is a sider elevational view in section of the hinge holder of FIG. 13 taken along line XV-XV of FIG. 14;

FIGS. 16 to 18 are front, rear and perspective views, respectively, by the hinge holder of FIGS. 13 to 15;

FIG. 19 is a perspective view of a hinge holder on the end of a horizontally extending column according to a third exemplary embodiment of the invention;

FIG. 20 is a perspective view of a hinge holder according to a fourth exemplary embodiment of the invention;

FIG. 21 is a front elevational view of the hinge holder FIG. 20;

FIG. 22 is a side elevational view in section taken along line XXII-XXII of FIG. 21;

FIG. 23 is a top view of the hinge holder of FIG. 20;

FIG. 24 is a side elevational view in section taken along its line XXIV-XXIV of FIG. 23;

FIG. 25 is a perspective view of a front plate according to the hinge holder of FIG. 20;

FIG. 26 is a front elevational view of the front plate of FIG. 25;

FIG. 27 is a top plan view of the front plate of FIG. 25;

FIG. 28 is a perspective view of a hinge holder according to a fifth exemplary embodiment of the invention;

FIG. 29 is a top plan view of the hinge holder of FIG. 28;

FIG. 30 is a perspective view of a hinge holder according to a sixth exemplary embodiment of the invention;

FIG. 31 is a front elevational view of the hinge holder of FIG. 30;

FIG. 32 is a top plan view of the hinge holder of FIG. 30;

FIG. 33 is a side elevational view in section taken along line XXXIII-XXXIII of FIG. 32;

FIG. 34 is a perspective view of a front plate according to the hinge holder of FIG. 30;

FIG. 35 is a front elevational view of the front plate of FIG. 34;

FIG. 36 is a top plan view of the front plate of FIG. 34;

FIG. 37 is a perspective view of the holding plate of FIG. 2 and of two connecting plates and connected with the insert screw of the hinge holder by a base hinge;

FIG. 38 is a perspective view of one of the connecting plates of FIG. 37;

FIG. 39 is a perspective view of a connecting plate according to a seventh exemplary embodiment of the invention;

FIG. 40 is a perspective view of a part of the base hinge of FIG. 37;

FIG. 41 is a front elevational view of the part of FIG. 40;

FIG. 42 is an enlarged front elevational view of the region XLII of FIG. 41;

FIG. 43 is a top view of a part of the holding plate of FIG. 37;

FIG. 44 is a front elevational view of the part of FIG. 43;

FIGS. 45 to 47 are perspective views of the hinge holder of FIG. 2 in different positions;

FIG. 48 is a perspective view of a holding plate according to an eighth exemplary embodiment of the invention;

FIG. 49 is a perspective view of a part of the base hinge of FIG. 48;

FIG. 50 is a front elevational view of the part of FIG. 49;

FIG. 51 is an enlarged front elevational view of region LI of FIG. 50;

FIG. 52 is a front elevational view of a part of FIG. 48;

FIGS. 53 and 54 are each a top view of a part of FIG. 48;

FIG. 55 is a perspective view of a connecting member with an attached additional strip of two adjacent angle sections coupled to the hinge holder of FIG. 2;

FIG. 56 is an exploded perspective view of the arrangement FIG. 55;

FIG. 57 is an enlarged side elevational view of an angle section of FIGS. 55 and 56;

DETAILED DESCRIPTION OF THE INVENTION

Figure 1:
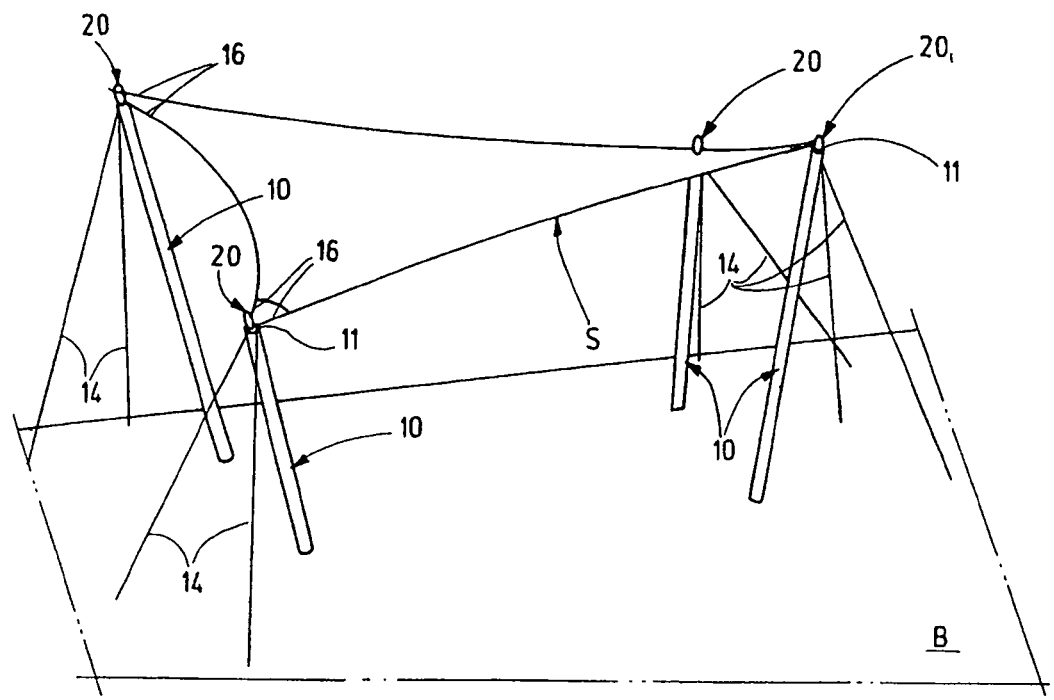
FIG. 1 is a perspective view of a roof covering composed of a sail mounted between four columns and referred to as a roof membrane.

A plane load-bearing structure has, according to FIG. 1, four somewhat outwardly inclined columns 10. Columns 10 are set apart from each other and reach upward in pairs from a floor area B and stretch between their free ends 11 a sail or membrane S having an approximately rectangular contour and made of a textile material to serve as a membrane-like roof surface. The membrane free ends 11 are tensioned by cables 14 against the floor area B and anchors (not illustrated herein) that are secured on the floor. The four corner regions of this membrane S or a correspondingly constructed net are connected in each case by short cable strands 16 to hinge joints 20 projecting from the head surface $12_k$ of the column 10. The head surface $12_k$ forms the upper edge of the supporting structure and is formed by an end disk 12 inserted into the column 10.

Figure 2:
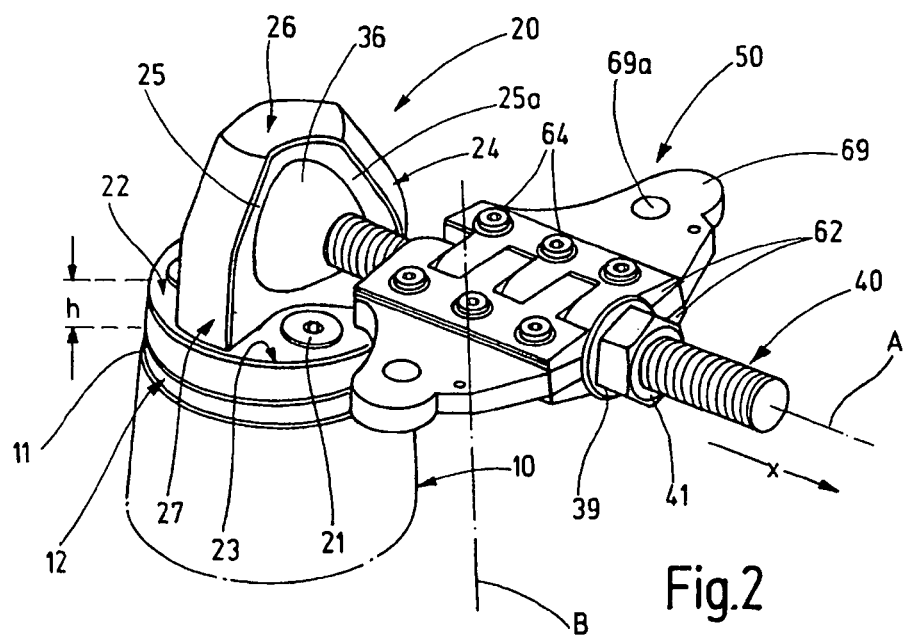
FIG. 2 is a perspective view of a hinge holder or joint mounted on the apex or head surface of a column of FIG. 1 and securing the sail on the column according to a first exemplary embodiment of the invention.

According to FIGS. 2 and 3, a base plate 22 having a diameter d of, for example, 117 mm and a height h of, for example, 20 mm, of the hinge joint 20 has a bearing element 24. Bearing element 24 has an angular configuration in FIGS. 7 and 14, a height $h_1$ of 100 mm and a thickness e of approximately 37 mm, with two molded-on leg sections 25, $25_a$. The leg sections form a two-armed configuration having an angle w of approximately 120°, as shown in the top view of FIG. 7.

As clearly shown in FIGS. 3, 5, and 6 that two side surfaces 27 of a width e extend from a ridge surface 26 of the bearing element 24. The upper top region of the side surfaces 27 is slightly curved in the direction of the ridge surface 26. The width of the connecting region $25_q$ of the two curved sections 25, $25_a$ in the ridge surface 26 is designated as $e_1$ in FIGS. 7 and 12.

The ridge surface 26 and each of the side surfaces 27 define outwardly a wall region of the hinge joint 20 or more specifically the bearing element 24 that exhibits a curved longitudinal cross section. A relatively large aperture 30 is milled into the center of bearing element 24 as well as axially in relation to the central axis M of the hinge joint 20. The edge 32 of aperture 30 extends at an axial distance a of about 10 mm in relation to the planar ridge surface 26. The distance $h_2$ between the center Z of the aperture and the base plate 22 measures approximately 50 mm. Due to the milling and the angular configuration of the bearing element 24, that edge 32 is slightly curved in the cross section and defines a surface region 31 of the hinge joint 20. This surface region 31 is matched to a part of the surface of a bearing ball 36 (described below) that is capable of resting flush with the surface region 31 in the tensioning direction x (FIGS. 2, 11, 14, 55). The forces are transferred to the bearing element 24 by the engagement surface.

Between the pair of curved sections $25/25_a$, there is a triangular surface section of the head surface 23 of the base plate 22, which surface section is triangular in shape in the top view. Its central region shows a screw hole 29 for a connecting screw 21. FIG. 8 shows the position of two additional screw holes 29 in the base plate 22, one of the screw holes lying in the transverse axis Q of the base plate, and the two others lying on both sides of this transverse axis at distances $a_1$ from it of approximately 28 mm. Each screw hole 29, having a diameter i of 17 mm, passes over in the direction of the upper surface 23 of the base plate 22 into a funnel-shaped expansion $29_t$ having an upper surface diameter $i_1$ of 29 mm.

The dimensions of all of the parts of the hinge joint 20 are adjusted to the respective cable forces that may arise. The securement elements are designed to meet static requirements and can be matched to a plurality of cables 14. Below are listed the dimensions for forces that may occur, for example, at a pointwise attachment having a tensioning force of approximately 100 kN.

FIG. 10 depicts the rotary screw 40 in the horizontal position as well as two of the three connecting screws 21, which approximately flank the curved section $25_a$.

The connecting screws 21, shown at the upper end in FIG. 3, in the attachment position, extend into the screw holes $29_e$ of the end disk 12 of the column 10.

In the working position, the bearing ball 36 having a diameter $d_1$ of approximately 74.5 mm sits in the aperture 30 of the bearing element 24. In the example according to FIGS. 11 and 12, this bearing ball 36 is provided with a surface 35 and a radial passage 37. The surface 35 serves as the stop face for the head 38 of a rotary screw 40 having a diameter f of 26 mm. A washer 39 engages to the head 38. According to FIG. 12, the longitudinal axis A of the rotary screw 40 of the bearing ball 36 is to be rotated with the bearing ball at an angle $w_1$ of approximately 80° (swivel level $A_1$ of the longitudinal axis A of the screw). Likewise, the bearing ball 36 can be swiveled horizontally. The possibilities of the directions of the bearing ball 36 in the bearing element 24 describe a conical shape.

FIG. 2 shows an inventive hinge joint 20 and the connecting member 50, also shown in FIG. 3, as individual parts for the sake of a better overview. The rotary screw 40 passes through the plate-like connecting member 50 fixed in position by a nut 41, supported on a washer 39 and described in detail below.

The hinge joint holder 20 of FIGS. 13 to 19 accommodates a bearing ball $36_a$ in its aperture $30_a$. The rotary screw 40 in this bearing ball extends into a blind hole 34 with an internal thread, that is, does not totally pass through this bearing ball $36_a$.

FIG. 19 offers a horizontal column $10_a$ as a variation. Arranged in parallel to the longitudinal axis E of this column, a protruding support tongue 42 with its position stabilizing support consoles 43 is molded to the column. The base plate 22 of the hinge joint 20 sits on this support tongue 42. The rotary screw 40 and the connecting member 51 extend parallel to the longitudinal axis E, that is, also horizontally. Each of the side edges of the connecting member 51 has a threaded fitting 70 described in detail with respect to FIG. 39.

FIG. 20 shows a cassette-like or sleeve-shaped body 80, which can be secured, for example, on a wall area F with retaining screws 18. The screw holes 19 are provided in body 80 for these retaining screws. This body 80 has two plates 82 protruding in parallel from a rear wall 81 having a height $h_4$ of 100 mm. The plates have a width $b_3$ of 140 mm, an overhang length $n_1$ of 120 mm and a thickness $e_4$ of 20 mm. The height $h_5$ of the interior space 79 of this body 80 also measures 100 mm. Between the free ends of those plates 82, a front plate 84 of a height $h_5$ contains the aperture 30 with the matching surface region 31. The aperture 30 of the front plate 84 can accommodate the bearing ball 36 without the rotary screw. FIGS. 25 to 27 show the shape of this front plate 84 with the inwardly shaped side wall surfaces 85 as well as a horizontal cross section that tapers in the direction of the central axis G of the front plate 84. The ridge surface 86 is constructed accordingly (FIG. 27).

This front plate 84 can also be inserted into a body $80_a$ that has asymmetrical overhang plates 83 (see FIGS. 28 and 29). In the top view, each of the overhang plates is provided with an overhang tongue 88 on a side surface. The distance $n_2$ between the overhang tongue and the rear area of the rear wall 81 is greater than the length of the other longitudinal side 87. In this case, the transversal distance $b_4$ between the longitudinal side 87 and the overhang tongue 88 is 92 mm.

FIG. 30 shows a different design concept of the wall joint 90. Two console plates 93 having an overhang length k of 48 mm project frontward at a distance $h_7$ of 70 mm from a rear plate 92 having a height $h_6$ of 150 mm, a width $b_5$ of 66 mm, and a thickness $e_4$ of 10 mm. The rear plate 92 is secured with retaining screws 18 on a wall that is not illustrated herein.

Each of the console plates 93 that resemble tongues in the top view has a hole 94 for a connecting screw $21_a$ in the central axis T of the console plates. The screw 21a secures an annular retaining body 96 of the wall joint 90 between the console plates 93. Retaining body 96 holds a bearing ball $36_a$ in a central aperture 30.

The aperture 30 is centered in relation to the retaining body 96. Retaining body 96 has height $h_5$ of 70 mm, a thickness $e_6$ of 31 mm, and a width $b_3$ of 54 mm. The aperture 30 has a center Z.

The connecting member 50 of FIGS. 2 and 3 has a width n of 120 mm and projects in a wing-like or radial manner from the rotary screw 40. The rotary screw 40 passes through a central base hinge 52 composed of two hinge halves 54, $54_a$. Each hinge half has a tubular part 56 having a width $e_2$ of 40 mm, according to FIG. 40, with a tubular channel 57 having a diameter $d_2$ of approximately 28 mm for accommodating the rotary screw 40. Tubular channel 57 has three radial slots 58 as well as partial ring ribs 59 of the tubular part 56. The ribs 59 extend between the radial slots 58. The other hinge part $54_a$ is constructed in the same way so that, when the two parts are fitted together, the radial slots 58 in one part of the hinge 54 or $54_a$ is capable of receiving the partial ring ribs 59 of the other part of the hinge $54_a$ or 54, respectively. These two parts 54, $54_a$ of the hinge are held together by the rotary screw 40 that passes through their common tubular channel 57.

A wing plate 66 is inserted as the connecting tension bracket into the respective external oblong slot 60 of that hinge parts 54 or 54$_a$, respectively. The screw holes 63 extend through overhang ribs 62 defining slot 60. A molded-on push bar 68 forms a linear edge 67. This wing plate is secured in position with three socket head cap screws 64 that cross the oblong slot 60 and the drill holes 65 of the push bar 68. The configuration of this wing-shaped connecting plate 66 resembles that of the lid of a grand piano and ends relative to the push bar 68 with a protruding semicircular tongue piece 69 that contains a passage hole 69$_a$ near the edge forming a connection point.

FIG. 39 is s perspective view of a wing plate 66$_a$ that has, instead of the tongue piece, a straight side edge 67$_a$ that extends at an angle $w_2$ of, for example, 30° in relation to the free edge 67 of the plate 66$_a$. This obliquely extending side edge 67$_a$ rests against a lateral tube 72, which accommodates a hexagonal nut 73 with a push-on disk 74 having a semicircular cross section. In this case, it involves the threaded fitting 70.

FIGS. 45 to 47 show different positions of the overhang plate 60 of a connecting member 50. In FIGS. 45 and 46, the rotary screw 40 extends at approximately right angles to the longitudinal axis E of the column 10 or more specifically the central axis M of the hinge joint 20. In FIG. 47, the longitudinal axis A of the rotary screw 40 is folded upward at an angle t of approximately 45° in relation to the central axis M.

The connecting member 50$_a$ of FIG. 48 resembles the just described connecting member 50 with the one difference being that the rotary screw 40 passes through a central tubular channel 77 of the connecting member 50$_a$ constructed as one piece. The central hinge of FIG. 37 is missing here. The connecting member 50$_a$ is constructed as a flat plate, since, instead of a pairing of two hinge halves 54 according to FIGS. 48, 49, a compact base plate 78 has the central tubular channel 77. The vertex $e_3$ of the base plate 78 is 40 mm, the length n is 120 mm, and the width b is 100 mm. The distance $b_1$ between the two rows of screw holes 63 measures 70 mm. Their distance $b_2$ from the adjacent longitudinal edge 61 is 15 mm in each case. The clear height $h_3$ of the lateral oblong slots 60 is 13 mm, a distance that matches the dimension in FIG. 42.

The drawings do not show that in this case, too, it is possible to use the described threaded fitting 70 of FIG. 39.

According to FIGS. 55 and 56, the connecting member 50 can also be used as the connecting element for strip-shaped keder profiles 100. Such a keder profile 100 is connected to the connecting member 50 by tension brackets 98 mounted in a rotationally limited manner at both ends. At the same time, the pins 76 pass through the keder profile 100 and the tension bracket 98, each of which is fixed in position at both ends by a safety cotter pin 75 passing radially through the pins 76. The pins 76 also pass through both the hinge parts 54 and 54$_a$, respectively, with a washer 39$_a$ on both sides of the tension bracket 98.

Each of the two keder profiles 100 of FIGS. 55 and 56 has two angle sections 102 that are molded by extrusion molding from a light metal alloy with each of these angle sections having an L-shaped cross section. In FIG. 55, two angle sections form together with a base arm 104 an overhang plate as well as two end strips 106, reaching upward at a right angle from the overhang plate at an edge. According to FIG. 57, each angle section 102, has a cross-sectional height $h_8$ of 50 mm, a cross-sectional width $b_6$ of approximately 80 mm, as well as a thickness $f_1$ of 12 mm or $f_2$ of 13 mm, and contains a plurality of longitudinal channels 108 or 109, respectively. In addition, the base strips 104, which lie one over the other, form with the recesses 110$_a$, 111$_a$ situated one over the other and being a part of the external surfaces 105 (FIGS. 55 and 57) of the base strips. A common central channel 110 has an approximately rectangular cross section, and a common longitudinal channel 111 has a circular cross section.

The end strips 106 contain the passage slots 107 crossing the end strips receiving the tension brackets 98 and terminate in each case with a longitudinal edge 112. An oblong slot 114 extends in longitudinal edge 112. On the other hand, oblong slot 114 issues from the adjacent longitudinal channel 109. This oblong slot 114 serves to accommodate a keder secured on the edge of an assigned textile surface. This keder has to be enveloped by the membrane welded together. The keder of a defined strength then sits rigidly and immovably on the edge of the textile surface. This keder has to transfer the forces in the transverse direction to a structural element to the keder profile 100 in the example of FIG. 55.

Figure 58:
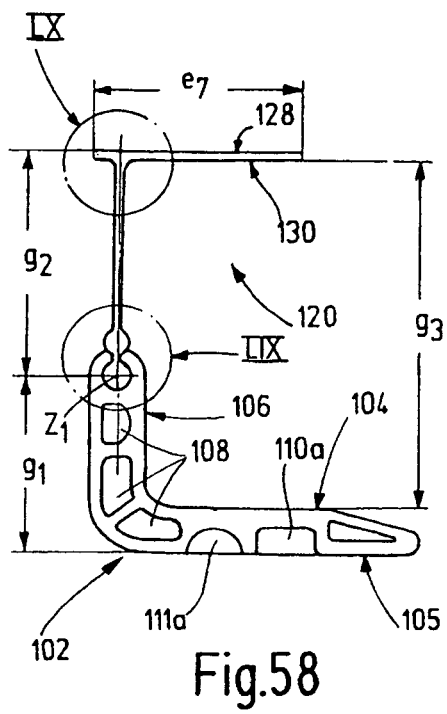
FIG. 58 is a side elevational view of the angle section of FIG. 57 with an attached top.
Figure 59:
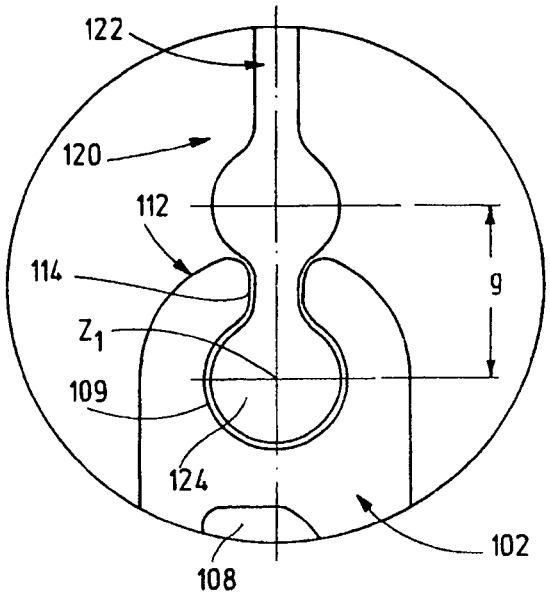
FIGS. 59 and 60 are enlarged side elevational views of regions LIX and LX, respectively, of FIG. 58.
Figure 60:
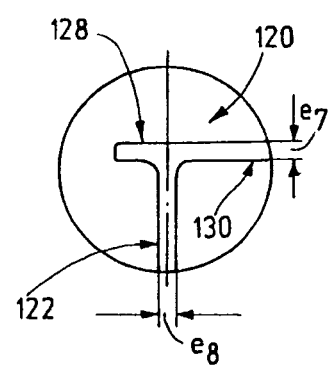

FIGS. 58 to 60 show a portion of a mounting section 120, having a right angular cross section, for the angle section 102. A shaped plate 122 extends from the end strip or transverse strip 106 of the profile. The shaped plate sits with an endwardly molded-on round bead 124 in the longitudinal channel 109 of the angle section 102. Above the longitudinal edge 112, which is semicircularly curved in the cross section, a second shaped bead 126 of the shaped plate 122 is provided. The center points of the two beads 124, 126 form a distance g of 8.6 mm in this exemplary embodiment. The distance $g_1$ of the center point $Z_1$ of each round bead 124 from the underside 105 of the base arm 104 of the angle section 102 measures 44 mm. The distance $g_2$ of the center point $Z_1$ from the upper surface 128 of a transverse plate 130, which is molded endwardly at a right angle onto the shaped bar 122, is 56 mm. The transverse plate has a width $e_7$ of 50 mm and a thickness $e_7$ of 2 mm. The clear distance $g_3$ of the transverse plate 130 from the base strip 104 measures 85 mm. The thickness $e_8$ of the shaped plate 122 is only slightly larger than the thickness $e_7$.

Figure 61:
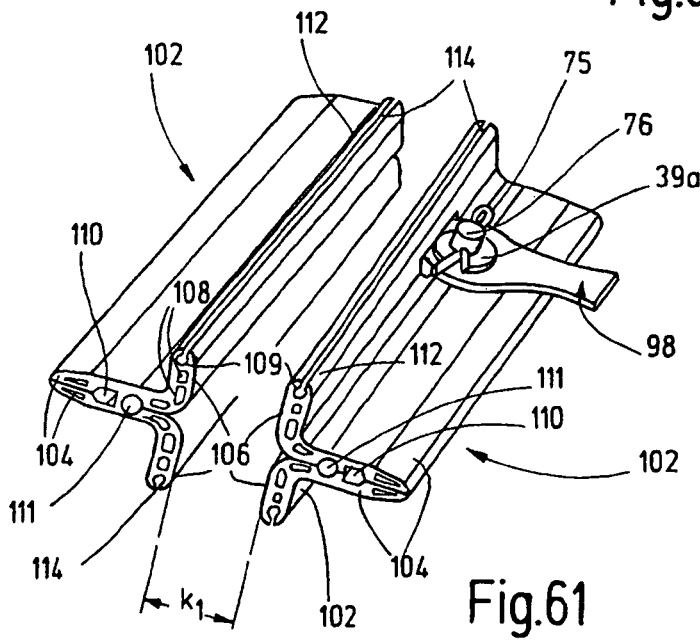
FIG. 61 is a perspective view of two strips that are assigned to each other.
Figures 62, 63:
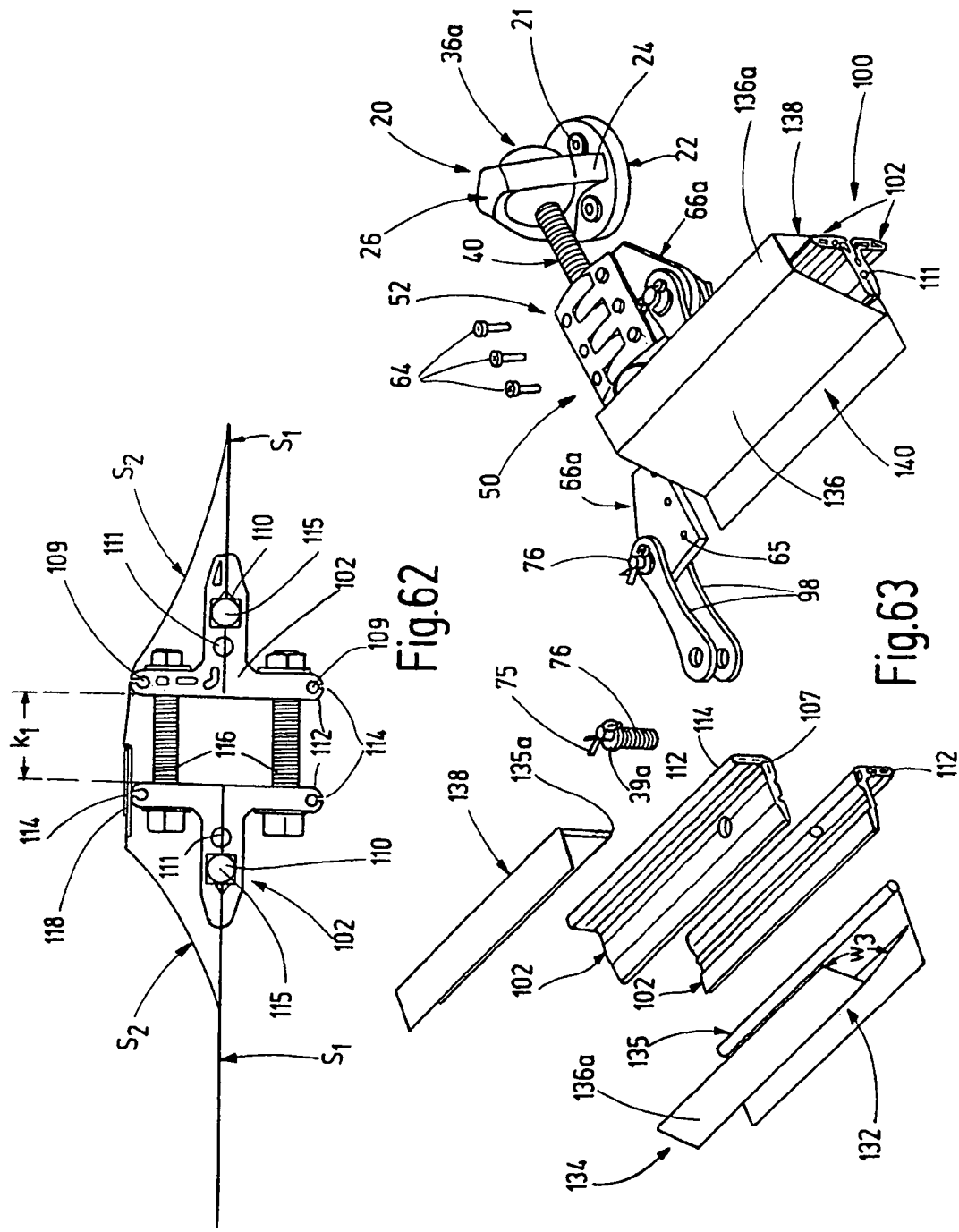
FIG. 62 is a front elevational view of an installation of the strips of FIG. 61.
FIGS. 63 and 64 are exploded perspective views of two additional connecting member arrangements.

In FIGS. 61 and 62, two transverse strips of keder profiles 100 made of light metal sections are assigned to each other at a distance $k_1$. In FIG. 62 the end or transverse strips 106 of their angle sections 102 are connected by spacing screws 116. In this case, the figures show two membrane webs $S_1$, which are clamped with an edge in a respective central channel 110 by an inserted profile bar 115. Two cloth strips $S_2$ are laid over the angle sections 102 to protect them, are connected to each other on a longitudinal plate 118, and terminate on the surface of the membrane webs $S_1$. Owing to the oblong slot 114 of the longitudinal edge 112, this longitudinal plate is positioned in the longitudinal channel 109 adjacent to this longitudinal edge and extends at a distance in parallel to the spacing screws 116.

FIG. 63 shows a device analogous to that in FIG. 56, where the keder profile 100 is provided with a housing 140. This housing has a floor plate 132 with a profile bar 135 having a circular cross section. The profile bar in the working position rests in the transverse channel 111 of the transverse strip 100. A wall plate 134 having an angular cross section is hinged to the floor plate 136 with both wall strips 136, 136$_a$ of the wall plate defining an angle $w_3$ of approximately 130°. In the working position, an angle section 138 is connected to the narrow wall strips 136$_a$. The free edge of the angle section also forms a profile bar 135$_a$. In the working position, this profile bar rests in the upper longitudinal channel 109 of the upper angle section 102.

Figure 64:
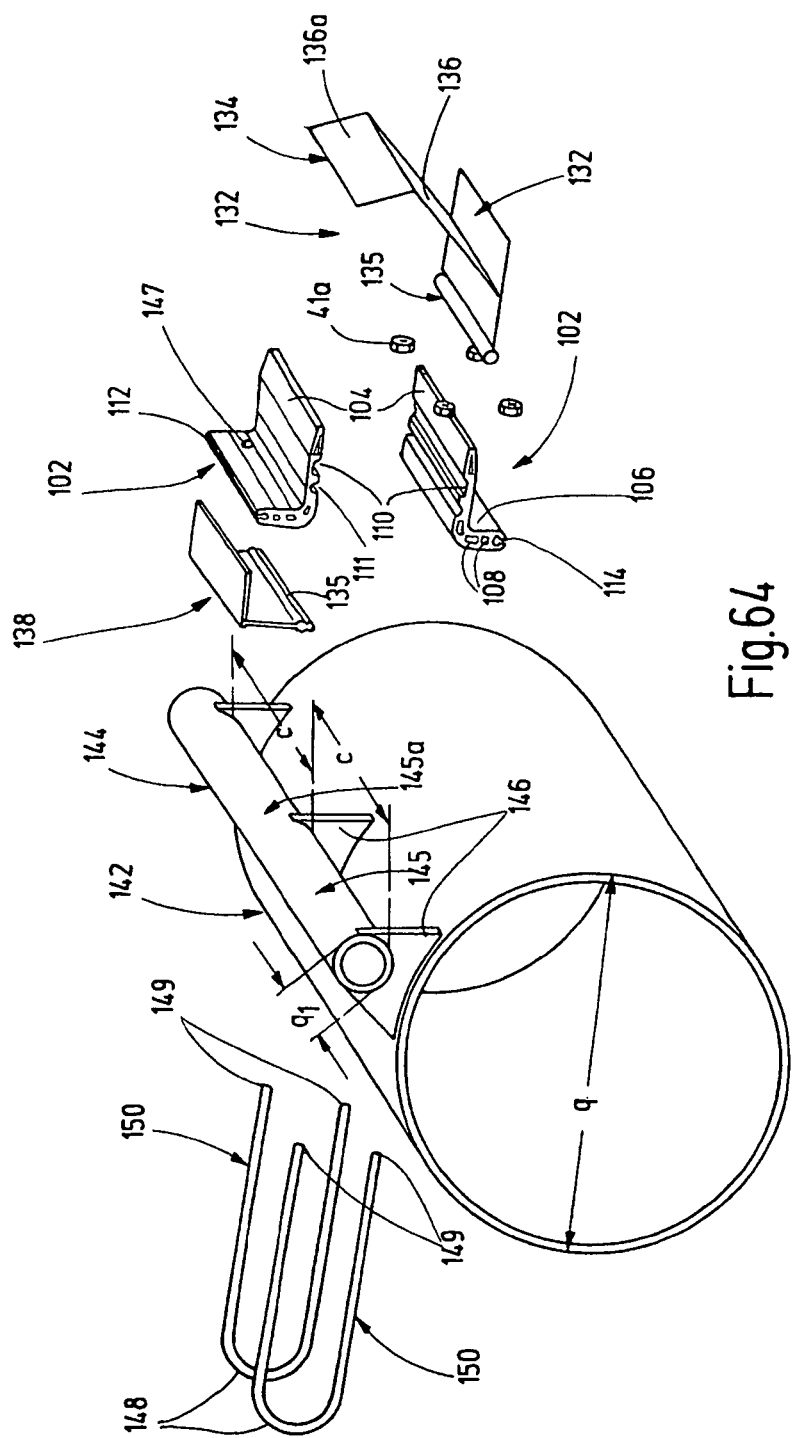

FIG. 64 illustrates a connecting device of two net or cloth surfaces (not illustrated). A retaining tube 142 shown in sections and exhibiting an external diameter q, is connected to a spaced ridge tube 144 having a significantly smaller diameter $q_1$ by three radial plates 146. U-shaped clamps 150 may be slid onto this ridge tube 144. The clamps can be secured with their bow end 148 on the ridge tube and are slid with a screw end 149 through a hole 147 in one of the assigned angle sections 102. Threaded nuts 41$_a$ secure the two screw ends 149 of the clamp 150 on the angle section 102, on which the net or cloth surface is secured. The result is, for example, a rigid connection between two such textile surfaces resting in the adjacent hole sections 145, 145$_a$ of the length c of the ridge tube 144.

While various embodiments have been chosen to illustrate the invention, it will be understood by those skilled in the art that various changes and modifications can be made therein without departing from the scope of the invention as defined in the appended claims.

What is claimed is:

1. A load-absorbent device for introducing load forces into supporting structures, comprising:
    at least one bearing element anchorable on a supporting structure and having a support surface forming a spherical cap;
    a load-absorbing member having a tension rod connected to said bearing element;
    a connecting device for tensioning members interacting with said tension rod, said connecting device having a first connecting wing projecting laterally from a longitudinal axis of said tension rod and having a first connection point offset from said longitudinal axis; and
    a spherical body attached to said tension rod forming a hinge joint with said bearing element and being supported on one part of said support surface of said bearing element.
2. A load-absorbent device according to claim 1 wherein said connecting wing swivels on said tension rod about said longitudinal axis.
3. A load-absorbent device according to claim 2 wherein said connecting wing is swivelable about a swivel axis perpendicular to said longitudinal axis.
4. A load-absorbent device according to claim 1 wherein a second connecting wing projects laterally from said longitudinal axis of said tension rod and has a second connection point offset from said longitudinal axis, said first and second connecting wings extending in opposite directions away from said longitudinal axis.
5. A load-absorbent device according to claim 1 wherein said first and second connecting wings comprise similarly shaped first and second plates, respectively, said plates being rigidly connected to a hinge member forming a swivel bearing of said first and second connecting wings on said tension rod.
6. A load-absorbent device according to claim 5 wherein said hinge member is connected to be rigidly coupled, unitary and one piece with said connecting wings, said connecting wings being horizontal to one another in a common plane.
7. A load-absorbent device according to claim 5 wherein said hinge member has first and second bearing parts coupled to said first and second connecting wings, respectively, said bearing parts being swivilable independently of one another on said tension rod about said longitudinal axis.
8. A load-absorbent device according to claim 1 wherein said tension rod has an external thread with an adjusting nut thereon forming an axial safeguard of said connecting device.
9. A load-absorbent device according to claim 1 wherein said connecting device is coupled to means for securing at least one of sheet-shaped structures and cables thereto for transferring load forces.

\* \* \* \* \*